UNITED STATES PATENT OFFICE.

ROBERT M. THOMPSON, OF SUTTON, NEBRASKA.

WURTZILITE PRODUCT.

SPECIFICATION forming part of Letters Patent No. 716,787, dated December 23, 1902.

Original application filed April 23, 1898, Serial No. 678,634. Divided and this application filed October 26, 1900. Serial No. 34,503. (No specimens.)

*To all whom it may concern:*

Be it known that I, ROBERT M. THOMPSON, a citizen of the United States, residing at Sutton, in the county of Clay and State of Nebraska, have invented certain new and useful Improvements in Wurtzilite Products; and I do hereby declare the following to be a full, clear, and exact description of the invention, such as will enable others skilled in the art to which it appertains to make and use the same.

This is a divisional application of Patents No. 655,130 and No. 655,131, issued to me July 31, 1900, and for which applications were filed, respectively, April 23, 1898, Serial No. 678,634, and March 3, 1900, Serial No. 7,237. These patents relate to the method and the present application appertains to the product which is available in the industrial arts for various uses for which the crude article is not susceptible.

Wurtzilite in its natural state is infusible and insoluble and otherwise lacking in the attributes of a bitumen of commercial value, yet possessing qualities desirable for many purposes. When treated as set forth in my prior patents noted above, the wurtzilite is rendered soluble and fusible, yet retaining all the natural characteristics of color, form, elasticity, hardness, and the like.

In accordance with my invention the crude wurtzilite is confined in a retort or vessel closed to atmospheric influence and subjected to the action of heat from 600° to 1,000° Fahrenheit. This treatment, at the outset, softens the mineral and reduces it to a spongy state, and, if long continued, for a period of several hours, reduces it to a complete fused or melted state, when it can be drawn off for use, either in its liquid state, or it may be partially cooled and molded or worked, as desired, being pressed into any shape, or have a hardening agent combined therewith, or it may be allowed to completely cool and solidify, the resultant product being so changed as to be readily soluble in the ordinary solvents for liquefying caoutchouc and like substances and also fusible in an ordinary vessel, thereby differing essentially from the mineral in its crude state.

The wurtzilite product possesses all the properties of the crude mineral in form, color, hardness, and elasticity and is a valuable acquisition to the arts, either alone or in combination with a hardening medium, thereby adapting it for use in the manufacture of waterproof pliable and semipliable paving compositions and sheathings and solid articles of great density and hardness. When dissolved in spirits of turpentine, bisulfid of carbon, naphtha, chloroform, or other solvent or menstruum, the wurtzilite product constitutes a valuable agent in a varnish or paint composition, either with or without a pigment, and may be used for covering roofs and other surfaces to be protected.

When a hardening material is to be combined with the wurtzilite product, the union is effected with the best results when the substance is in a fused or melted state, either at the beginning of the process or at any stage, owing to the elimination of the volatile constituents of the mineral. Instead of retorting the mineral it may be heated by steam, and this heating medium is deemed preferable in that it retains all the properties of the mineral, and under its action the mineral is softened and has the consistency of cheese. The time consumed in attaining the required temperature by the use either of a retort or steam will be varied in accordance with the amount of mineral treated.

One way of carrying the method into practice for making solid articles is as follows: The crude mineral (or the soluble and fusible product) is fused or melted by the action of heat and a hardening material—such as mica, asbestos, or soapstone—is incorporated therewith and afterward a quantity of sulfur. After the addition of these materials in proper proportions the mixture ferments or rises in the form of a yeast-like mass, which is subjected to heavy pressure to form the article desired or reduced to a block of the material, which may be afterward cut by any suitable means and polished. In heating the mineral and before the addition of the materials specified it is first melted in a closed vessel or retort and then placed in an open vessel with as much heat applied thereto as it will stand without catching afire, and when in the latter condition the mica, asbestos, or soapstone, either one or all, if desired, is thoroughly commingled with the said heated mineral by stirring the mass. As much of any one of the said materials will be used as the heated mass of mineral will take up, and after this operation sulfur is incorporated in quantities of from four per cent. to ten per cent. in weight and according to the hardness required. When the sulfur is mixed with the other materials, as stated, it will set up a fermentation, and while in this condition the mass is molded under very heavy pressure and preferably in a copper mold. The sulfur is added to the mixture to vulcanize it, and this is increased by molding under heavy pressure. In adding the mica, asbestos, or soapstone they are first pulverized, so as to become readily incorporated with the mineral, and a composite article of great density and hardness is formed.

It will be understood that the molds used may be of any preferred size, shape, and construction suitable for the purpose and to form different articles.

Another way of carrying the method into practice is to incorporate either one or all or any desired combination of the aforementioned physically-hardening materials—mica, asbestos, and soapstone, or their equivalents—with the wurtzilite while the latter is in either a softened or a fused state and then subject the mass to pressure in a mold or in any other preferred way. When the wurtzilite is to be used as a sheathing or coating, it is incorporated with a suitable solvent and reduced to a liquid state, spread upon the material to which it is to be applied, and the hardening material then pressed into the composition to increase its durability and wearing qualities. The incorporation of either of the described materials with the wurtzilite under pressure will produce an exceedingly hard and dense product, which may be used in the manufacture of paving-bricks, insulators, and various other articles.

As set forth in the foregoing description, the wurtzilite may be hardened physically by combining mica, asbestos, or soapstone therewith and both physically and chemically by employing sulfur in connection with one or all or any combination of these materials. I have discovered also that when the volatile elements of the wurtzilite are eliminated by the action of heat the resulting wurtzilite product may be vulcanized or chemically changed and hardened by the use of sulfur alone. In hardening the wurtzilite in this manner a proper proportion of sulfur—as four to ten per cent., by weight—is incorporated with the fused or melted wurtzilite (or the refined hard wurtzilite product) in a suitable mold or vessel and the mixture allowed to ferment and rise, when it is molded under heavy pressure. The amount of sulfur employed will vary according to the degree of hardness required.

When steam is employed to dissolve the wurtzilite, about three per cent. only of sulfur is required to effect the hardening. When asbestos is used as a compound with wurtzilite, I use ten to fifteen per cent. asbestos, to be pulverized one hundred and sixty per cent. fine, measured by weight. The same when soapstone is used. When mica is used in the compound, I use mica pulverized one hundred and sixty per cent. and from five to ten per cent., measured by weight. Each of the above minerals are used solely and alone in the respective amounts, as above stated, with wurtzilite, thus making a compound of wurtzilite with either of the above minerals in proportion as stated above. When all the following—to wit, mica, asbestos, soapstone, and sulfur—are used jointly as a compound, then fifteen per cent. total of equal quantities of the foregoing minerals can be used and incorporated with eighty-five per cent. of wurtzilite.

Roofing can be made by compounding wurtzilite with asphaltum or gilsonite in equal quantities and painting on metal roofs or rolling same on heavy paper with heavy rollers and sprinkling mica pulverized sixty per cent. fine over the surface.

It will be understood that my invention broadly contemplates the incorporation in any desired manner of a hardening material with the wurtzilite while the latter is in a softened or a fused state and the hardening of the latter in either of the ways set forth, and hence I do not limit myself to the exact kinds and proportions of materials herein specified and preferably employed for the purpose.

Having thus described the invention, what is claimed as new is—

The herein-described wurtzilite product combined with a hardening substance as mica, asbestos or soapstone, and a quantity of sulfur, in the proportions substantially as set forth.

In testimony whereof I affix my signature in presence of two witnesses.

ROBERT M. THOMPSON. [L. S.]

Witnesses:
B. F. SCHAEFLE,
M. L. LUEBBER.